United States Patent [19]
Blair

[11] Patent Number: 4,903,618
[45] Date of Patent: Feb. 27, 1990

[54] SOIL INJECTION SYSTEM

[76] Inventor: Quinton Blair, 1401 Camellia Dr., Quitman, Ga. 31643

[21] Appl. No.: 258,680

[22] Filed: Oct. 17, 1988

[51] Int. Cl.⁴ .......................... A01C 5/04; A01C 23/02
[52] U.S. Cl. ...................................... 111/118; 111/93
[58] Field of Search ................. 111/2, 6, 7, 4, 7.1–7.4, 111/89, 92, 93, 96, 97; 47/48.5

[56] References Cited

U.S. PATENT DOCUMENTS

| | | | |
|---|---|---|---|
| 1,871,529 | 8/1932 | Karshner | 111/6 |
| 2,177,792 | 10/1939 | Taylor | 111/7.4 |
| 2,439,743 | 4/1948 | McEwen | 111/7 |
| 2,789,522 | 4/1957 | Barton | 111/6 |
| 3,211,114 | 10/1965 | Ucinhaska | 111/7 |
| 3,450,073 | 6/1969 | Baker | 111/6 |
| 3,546,886 | 12/1970 | Jones | 47/48.5 |
| 4,233,915 | 11/1980 | Kordon | 111/6 |
| 4,278,035 | 7/1981 | Pickett | 111/6 |

FOREIGN PATENT DOCUMENTS 356300 9/1961 Switzerland .......................... 111/6

Primary Examiner—Danton D. DeMille
Attorney, Agent, or Firm—Dowell & Dowell

[57] ABSTRACT

An injection implement for introducing chemicals to subsurface areas which includes a ground penetrating bit and a fluid injector which are hydraulically operated so as to slectively penetrate the earth's surface and which also includes a chemical supply circuit and tamping mechanism for initially introducing chemcials to the injector under pressure and thereafter closing the opening in the earth's surface created by the penetrating bit and fluid injector so as to prevent the escape of chemicals to the atmosphere.

18 Claims, 2 Drawing Sheets

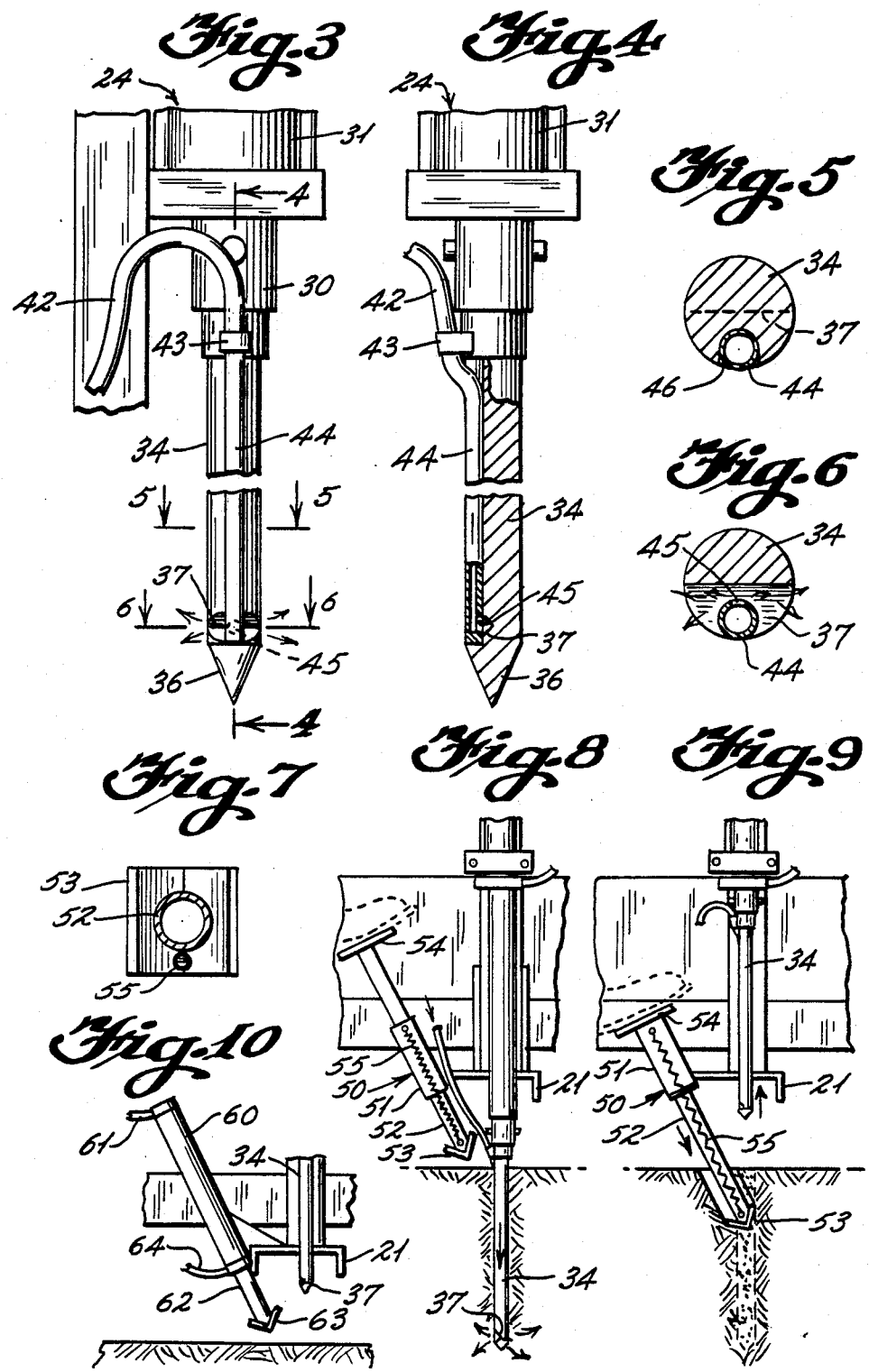

SOIL INJECTION SYSTEM

BACKGROUND OF THE INVENTION

1. Field of the Invention

This invention is generally directed to earthworking and earth boring equipment and more specifically to an implement for injecting chemicals to subsurface areas in order to treat the soil or the roots of plants or trees and thereafter seal the opening in the earth's surface to prevent the escape of chemical fumes to atmosphere. The implement of the present invention is designed to be conveniently mounted to conventional farm equipment including tractors so as to be powered by the hydraulic system of such equipment. The implement includes a ground penetrating bit which supports a fluid injector nozzle adjacent the penetrating end thereof and which cooperates with the fluid injector nozzle to prevent the nozzle from being obstructed as the nozzle is introduced to subsurface areas. Chemicals are introduced through the injector nozzle in predetermined or measured quantities after the chemicals have been introduced into a metering tank. A source of pressure is utilized to discharge the chemicals from the metering tank so that the chemicals are introduced under high pressure through the injector. Following the injection of a chemical to a given location, the bit and nozzle are withdrawn while a tamping mechanism is simultaneously operated so as to close the opening in the earth's surface so as to prevent the escape of any chemical gases to atmosphere.

The injection implement of the present invention may be utilized to inject various types of chemicals including various plant growth stimulants, fertilizers or herbicides and poisons as may be required in a given location.

2. History of the Related Art

It is a well known practice to introduce various chemicals to subsurface areas in order to effect the growth conditions of soils. In some instances, chemicals are added at depths of between a foot to three feet in order to destroy potentially damaging weed growth or plant growth which would otherwise interfere with the growth of agricultural crops. In other instances, the chemicals may be supplied to destroy parasitic or other animal life which may be threatening to a particular agricultural crop. On the other hand, it may be necessary to supply plant growth nutrients at relatively deep locations in order to support the growth of trees and other plants having deep root systems. The introduction of chemicals to subsurface areas is also preferred in instances where the chemical could adversely effect surrounding areas if the chemical were to be applied topically and therefore capable of being introduced into the ground water run off at a given location. By injecting the chemicals at a depth where the chemical will not mix with surface waters, chemicals are contained in the area where they will have the most effect and are prevented from effecting other environmental conditions until after such time as they have become sufficiently delute and non-toxic. One example of the injection of volatile chemical soil fumigants to subsurface areas is disclosed in U.S. Pat. No. 3,964,405 to Haglund et al. In this patent, the control of deeply rooted perennial weeds is accomplished by injecting fumigants at depths of between 14–24 inches below ground level at given rates of application.

There have been a number of different structures designed and developed to introduce chemicals to subsurface areas. The simplest and least complex type of injectors are designed to be portable and carried by a laborer in the field. Such units include a ground probe which is connected to a tank which may be pressurized by operation of a pump mechanism connected directly to the tank. In the field, the worker inserts the probe to a desired depth and thereafter opens the valve to permit the injection of a portion of the chemical retained within the pressurized tank. Such units have limited applicability in that they may only be used in well tilled areas where the penetration of the ground engaging wand is relatively simple. Further, such a system does not provide for insuring a specific measured quantity of chemical being introduced at each subsurface location and therefore the effective control of the amount of chemical is not possible. Further, the amount of chemical being dispensed is limited and the total effectiveness of such systems are directly dependent on the individual skill and strength of the worker in the field. Such systems may also be hazardous to individuals as the individual is directly exposed to the chemicals and the chemical injection site and thereby may be exposed to chemical fumes emanating from both the injector, spilled chemicals and chemicals introduced into the earth's surface.

In order to overcome the deficiencies of portable subsurface injectors, there have been various structures designed to be mechanically operated and which are utilized to introduce a chemical below the earth's surface. In some types of equipment, a bore is first made within the earth's surface after which a chemical is introduced into the bore. With this type of equipment, the chemical is exposed to atmosphere and fumes are allowed to emanate from the bore in the earth. Further, such systems are not efficient in that they require a significant amount of time in order to place the chemical at given subsurface areas. Other types of equipment include self-motorized vehicles which carry ground penetrating nozzles. One such self-motorized unit which is not utilized to inject gas but is used to detect subsurface gas in the soil is disclosed in U.S. Pat. No. 3,084,553 to Cullinan et al. Such equipment is prohibitively expensive for the conventional farmer in that a totally self-contained system must be purchased which system is only useful for the given purpose of subsurface soil testing or chemical injection. In addition, there are other problems which are inherent in many motorized injector systems. Often, the penetrating bit and chemical injecting nozzle are formed of the same element. In such instances, the injection openings from the bit may become clogged during repeated usage thereby preventing the effective injection of chemicals to a given location.

In U.S. Pat. No. 4,637,328 to Topham et al., a planting mechanism is disclosed which utilizes a pair of soil penetrating members for first depositing a quantity of seed at a specific predetermined depth and a fertilizer material at a given depth. Unfortunately, such equipment is not designed for deep subsurface penetration and is designed to be mechanically operated to relatively shallow depths where very little resistance is met by the injector nozzles. Such a system would not be operative at substantial depths including one to two feet below the surface.

Other more complicated types of subsurface injectors have also been designed. One example is disclosed in U.S. Pat. No. 2,789,522 to Barton. This apparatus is an extremely bulky piece of equipment which is trailered across a given area and which is provided with pumps for operating an injector mechanism. As with other prior art mechanical injectors, the structure is prohibitively costly and difficult to maneuver.

SUMMARY OF THE INVENTION

This invention is directed to an injection implement for introducing chemicals to subsurface areas at depths generally exceeding a foot or more and to an implement which is designed to be easily mounted to a conventional farm vehicle such as a tractor so as to be powered by the hydraulic system of the vehicle. The injector implement includes a ground penetrating bit which supports a fluid injector in such a manner as to prevent the injector from being clogged by material as the bit penetrates the earth's surface. The implement further includes a chemical supply tank which is mounted in line with the injector through a metering unit wherein a specific measured quantity of chemical is initially retained. A source of high pressure gas is connected in line with the metering unit and is operable to discharge chemical from the metering unit and force the chemical under high pressure through the nozzle located beneath the earth's surface. The implement further includes a tamping mechanism which may either be manually or mechanically operated upon the withdrawal of the drill bit and nozzle from the earth's surface so as to simultaneously close the opening in the earth's surface to prevent the escape of any harmful chemical gases or fumes and to seal the chemical in the subsurface location.

It is a primary object of the present invention to provide a chemical injector for dispensing chemicals at various depths beneath the earth's surface and in particular at depths of 12-36 inches or more wherein the implement is designed to be powered by the hydraulic system of a conventional farm vehicle.

It is another object of the present invention to provide a subsurface injector system which may be conveniently mounted to a conventional farm or other vehicle and which includes a ground penetrating bit and injector nozzle which are designed to introduce fluid along the axis of the bit and thereafter outwardly into the soil so that the nozzle will not be blocked by soil or other debris as the bit penetrates the earth.

It is also an object of the present invention to provide an injection implement which may be utilized to introduce toxic chemicals and other materials to subsurface areas wherein the toxic material is retained in its subsurface location by providing a tamping apparatus which is activated simultaneously with the withdrawal of the subsurface nozzle so as to prevent the escape of gases or toxic fumes to atmosphere.

It is yet another object of the present invention to provide an injection implement for introducing chemicals in either liquid or gaseous form to subsurface areas wherein the amount of chemical being introduced into the soil is initially metered so as to insure that only the proper amount of chemical is being introduced at any given area and after which metering, the chemical is introduced under high pressure to the subsurface location.

It is also an object of the present invention to provide an injection implement which may be utilized by farmers and other agricultural personnel and which is relatively safe for the operator and which is also economical to install on conventional farm machinery or other vehicles thereby making the injector available to a wide cross section of people who would not otherwise have an opportunity to avail themselves of the benefit of subsurface injectors.

BRIEF DESCRIPTION OF THE DRAWINGS

FIG. 3 is an enlarged side elevational view of the injector bit and injector nozzle of the present invention as taken along lines 3—3 of FIG. 1.

FIG. 4 is a partial cross sectional view taken along lines 4—4 of FIG. 3.

FIG. 5 is a cross sectional view taken along lines 5—5 of FIG. 3.

FIG. 6 is a cross sectional view taken along lines 6-6 of FIG. 3.

FIG. 7 is a cross sectional view of the tamping mechanism taken along lines 7—7 of FIG. 1.

FIG. 8 and FIG. 9 are perspective illustrational views showing the operation of the injector and tamping mechanism in sequence introducing chemical and thereafter closing the bore in the earth's surface in order to contain the chemical at a subsurface location.

FIG. 10 is a second embodiment of tamping mechanism of the present invention wherein the tamping mechanism is hydraulically controlled.

DESCRIPTION OF THE PREFERRED EMBODIMENT

Figure 1:
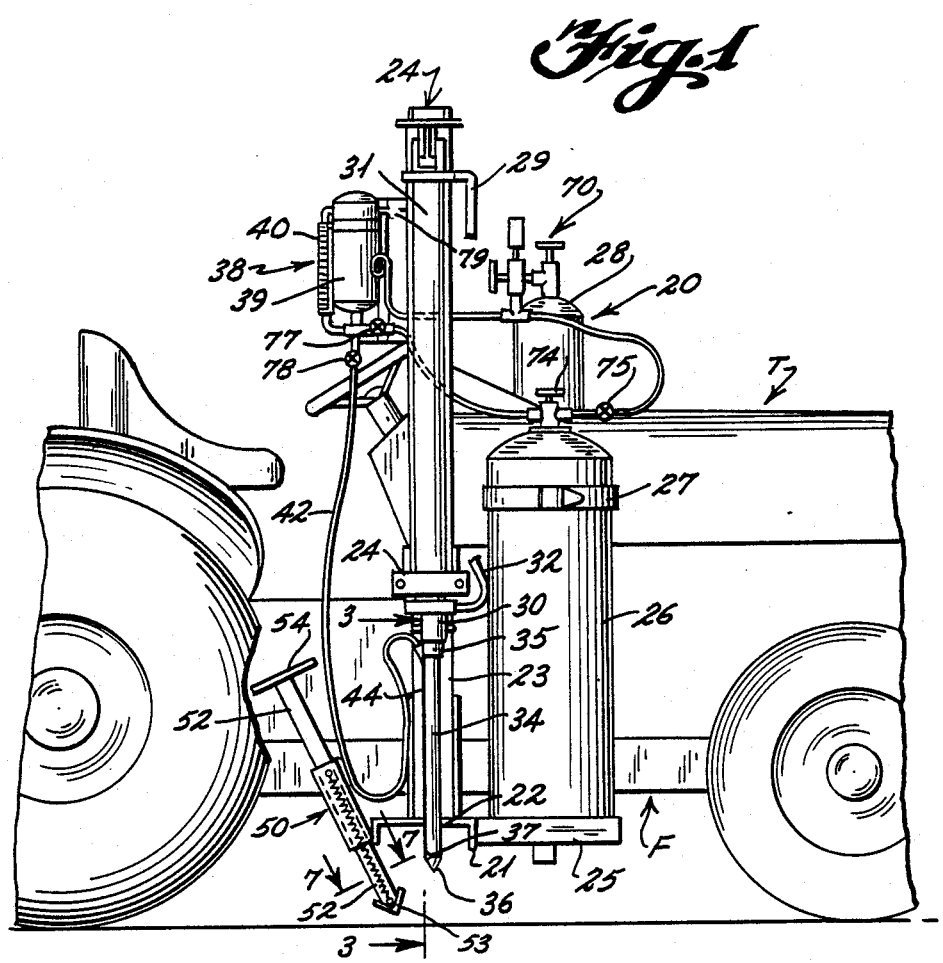
FIG. 1 is a partial illustrative view of the implement of the present invention as mounted to a conventional farm vehicle such as a tractor with the implement being shown in elevation.

With continued reference to the drawings, the injection implement 20 of the present invention is shown as being mounted to a conventional farm vehicle such as a tractor T. The implement is designed to be easily installed to a conventional vehicle such as a farm tractor without modification to the chassis of the vehicle. In the embodiment shown in FIG. 1, a support stand 21 is bolted or otherwise secured to the undercarriage or frame F of the tractor and is cantilevered outwardly with respect thereto. Although not shown in the drawings, the support stand includes a longitudinal beam member 22 which extends beneath the vehicle chassis and is bolted to the frame on either side thereof. Extending outwardly from the longitudinal beam 22 is a first vertical support bracket 23 which extends upwardly above the chassis of the vehicle. A hydraulic piston 24 is mounted to the vertical bracket 23 and is secured in place by bracket 24. The support stand further includes a platform element 25 on which is selectively seated a chemical supply tank 26. The supply tank is retained in fixed relationship with respect to the platform 25 by a chain, belt or other removable securing device 27 which extends from a second vertical frame mounted behind the tank 26 and which belt or chain 27 is selectively secured about the upper portion of the chemical supply tank.

Although not shown in FIG. 1, there is a second platform similar to that shown at 25 mounted on the opposite side of the vehicle. This second platform supports a tank 28 which includes a pressurized gas such as nitrogen for purposes of which will be discussed in greater detail hereinafter.

The hydraulic cylinder 24 may be of any conventional construction and is designed to be operated by the hydraulic control system of the tractor T. In this respect, a first hose 29 is connected to the upper portion of the piston which hose extends to a cooperative coupling with the vehicle hydraulic system (not shown). Fluid through conduit 29 is provided to drive the piston rod 30 downwardly with respect to the earth's surface. In order to withdraw the piston rod 30 back into the cylinder housing 31, a second hydraulic connection is made through hose 32 to the tractor's hydraulic system. In this manner, the operator may control the movement of the piston rod 30 by operation of the conventional controls associated with the vehicle's hydraulic system.

The ejection implement of the present invention further includes an earth penetrating bit 34 which is generally of a solid steel construction. The bit is mounted at its upper end portion 35 to the piston rod 30 and extends axially downwardly with respect thereto to a lower penetrating tip 36. A transverse groove or slot is provided as shown at 37 at the lower tip end 36 of the earth penetrating bit for purposes which will be described in greater detail hereinafter.

The injection implement further includes a chemical metering tank 38 which is mounted by bracket assembly 39 to the upper portion of the vertical support assembly 23. The metering unit includes a tank 39 into which a chemical may be selectively introduced and which is measured by sight glass gauge 40 which is mounted adjacent the tank and in fluid communication therewith.

The chemical from the metering tank assembly 38 is conveyed through conduit 42 to the upper end 43 of a discharge pipe 44. The discharge pipe is welded or otherwise secured along the length of the earth penetrating bit 34 and terminates in a nozzle end 45 having openings which are oriented toward the groove or slot 37 formed in the tip portion of the earth penetrating bit. With particular reference to FIGS. 3–6, the orientation of the opening or nozzle 45 relative to the slot 37 in the portion of the drill bit adjacent the tip 36 is shown in greater detail. With the arrangement disclosed, as the tip portion 36 penetrates the soil, the soil will be urged beyond the slot 37 and will not be able to penetrate in the area between the opening 45 and the slot 37. In this manner, any fluid being conveyed through discharge conduit 42 and through the pipe 44 will be conveyed outwardly into the soil. Although the fluid injection pipe 44 may be welded to the outside surface of the penetrating bit 34, it is preferred that an elongated groove 46 be made along the length of the shank of the bit 34 in which the pipe may be selectively seated so as to conform to the exterior configuration of the bit as shown in FIG. 5. In this manner, the discharge pipe 44 will be protected as the bit is driven into engagement with the earth by the operation of the hydraulic cylinder 24.

As shown in FIG. 1, the conduit 42 leading from the metering tank assembly 38 to the discharge pipe 44 is of sufficient length so that the conduit is extended as the piston rod 30 is activated to force the earth penetrating bit 34 into the earth surface. Generally, the conduit 42 will be adjusted so as to permit selective earth penetration to depths up to approximately three feet. Greater depths could, of course, be obtained depending upon the length of the piston rod, the bit element 34 and the length of conduit 42, all of which may be dimensioned as desired to permit the necessary depth of subsurface penetration for chemical dispensing.

With particular reference to FIGS. 1 and 7–10, the injection implement of the present invention further includes a tamping mechanism 50 which is operable to close the opening made in the earth's surface by operation of the hydraulic cylinder driving the earth penetrating bit 34 into the soil. The tamping mechanism is mounted to the support stand 21 in an angled relationship with respect to the axis of the hydraulic cylinder and earth penetrating bit 34. The tamping mechanism includes a housing 51 which is welded or otherwise secured to the support stand 21 in angled relationship thereto as shown in FIG. 1. The angle of inclination should be such that the axis of the housing 51 intersects the axis of the earth penetrating bit 34 at a point just below the earth's surface. The tamping mechanism further includes a movable rod 52 which is slideably retained within the housing 51. The rod 52 includes an outer end portion to which a V-shaped tamping or compaction plate 53 is welded or otherwise secured. The uppermost end of the rod 52 may be provided with an operating mechanism which in FIGS. 1, 8 and 9 includes a plate 54 which is designed to be engaged by the foot of the operator of the vehicle. In order to regulate the stroke of the rod 52 relative to the housing 51, a resilient or element spring 55 is secured with one end to the housing and the other end to a point along the rod 52 adjacent the compaction plate 53. During the operation of the tamping implement, and as shown in detail in FIGS. 8 and 9, when the earth penetrating bit 34 is in a fully lowered engagement into the ground, the tamping implement is in its fully withdrawn or uppermost position (FIG. 8). After the hydraulic cylinder 24 is operated to raise the piston rod 30 and earth penetrating bit 34 to an elevated position with respect to the ground, the operator engages the foot plate and forces the rod 52 of the tamping mechanism downwardly with respect to the housing 51 so that the tamping plate 53 closes the opening in the earth's surface as shown in FIG. 9.

As an alternative embodiment, as opposed to manually operating the tamping mechanism of the present invention, a separate hydraulic cylinder 60 may be provided and mounted to the support stand 21. As shown in FIG. 10, the hydraulic cylinder 60 takes the place of the housing 51 and piston element 52 of the embodiment shown in FIGS. 1, 8 and 9. In this embodiment, a first fluid conduit 61 is attached to the upper portion of the cylinder so as to supply fluid from the vehicle's hydraulic system to activate a piston rod 62 having a tamping plate 63 mounted to the forward end portion thereof. A second hose or hydraulic line 64 extends from the forward portion of the hydraulic cylinder to the conventional source of hydraulic fluid supply for the tractor. The hydraulic line 64 is utilized to supply fluid to raise the piston rod 62 to its elevated position with respect to the earth's surface. With the embodiment for a tamping mechanism disclosed in FIG. 10, the implement operator may utilize the hydraulic controls of the tractor or other vehicle in order to activate the tamping rod to force the plate 63 to seal the opening created in the ground by the earth penetrating bit 34.

Figure 2:
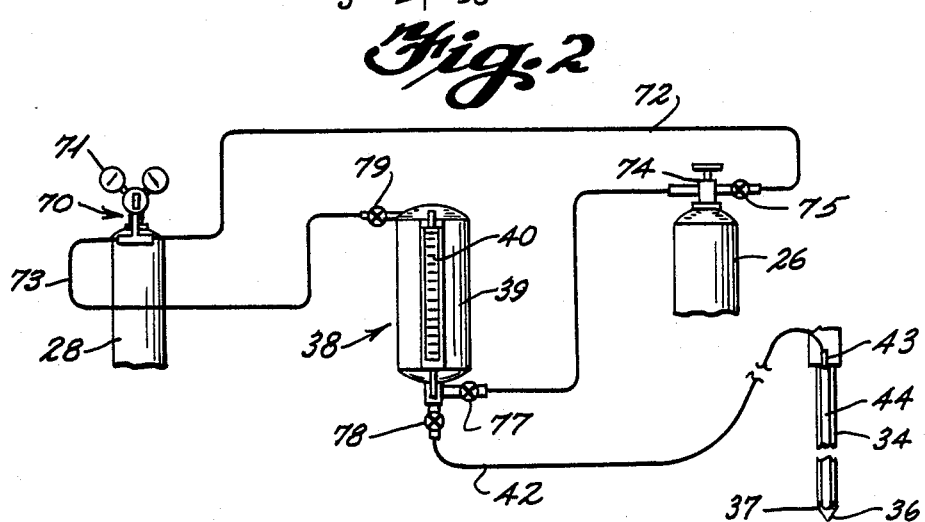
FIG. 2 is an illustrational view showing the chemical injection circuit of the present invention.

With specific reference to FIGS. 1 and 2 of the drawings, the chemical injection circuit of the present invention will be disclosed in greater detail. As previously discussed, the implement of the present invention may be utilized to inject various types of chemicals to subsurface locations. Such chemicals may be in the form of a gas, powder or liquid depending upon the nature of the chemical being dispensed. For purposes of explanation, the system will be described as is utilized to inject such chemicals as methyl bromide adjacent to the root system of trees. The fluid circuit is specifically designed to permit chemicals to be dispensed under high pressure by the use of a separate gas pressurization source. In the preferred embodiment, the pressurization tank 28 is filled with an inert gas such as nitrogen under pressure. In the embodiment shown in FIGS. 1 and 2, the nitrogen tank 28 is provided with a valve assembly 70 which includes pressure/temperature gauges 71. The valve assembly may be operated to supply pressurized gas either through discharge lines 72 to the primary chemical supply tank 26 or through line 73 to the chemical metering assembly 38. As previously discussed, a large capacity chemical tank, for instance a 200 pound tank, is mounted to the support platform 25. The chemical tank is provided with a valve assembly 74 which includes an inlet valve 75 located along the pressurization line 72 from the inert gas supply. When valve 75 is opened to the pressurization source and the pressurization valve assembly 70 opened to admit gas under pressure through line 72, the pressure is utilized to force chemicals from the tank 26 upwardly through the valve assembly 74 through intermediate chemical feed line 76 into the metering assembly 38 through valve 77. The quantity of chemical is monitored through the site gauge 40 and when an appropriate amount of chemical has been introduced, valve 77 is closed and pressure from the pressurization source tank 28 is closed through valve assembly 70.

Once the metering tank assembly indicates that a proper amount of chemical has been placed in the metering tank, the lower dispensing valve 78 which is connected in line with the metering tank is opened so as to communicate the tank with discharge line 42 which is connected to the injector. Thereafter, valve 79 mounted adjacent the top of the metering tank is open to admit high pressure inert nitrogen gas which forces the chemical within the metering tank through line 42 through the discharge opening in the end of the pipe 44.

After the chemical has been injected and the earth penetrating bit withdrawn by actuation of the hydraulic cylinder 24, valve 78 is closed as well as valve 79 with valve 77 being opened to begin another charging cycle for the metering tank. Although different types of connections may be made between the various tanks of the present invention, it is preferred that a metering unit be installed downstream of the primary chemical tank in order to insure that appropriate amounts of chemicals are being injected. Further, other types of pressurization sources may be utilized including separately powered pumps if necessary.

In the use of the injection implement of the present invention, once the hydraulic cylinder has been mounted to the mounting frame which supports the unit to the tractor, the hydraulic lines 28 and 32 are connected to the vehicle's hydraulic system so that the piston rod 30 may be manipulated upwardly and downwardly dependent upon the movement of fluid through the hydraulic lines. Control of the fluid is accomplished through the conventional controls which are already mounted on the vehicle. Thereafter, the chemical tank containing a chemical that is to be dispensed or injected into the ground is mounted upon the platform 25 and secured by the mounting belt 27. Thereafter, the nitrogen tank is mounted to the opposite side of the tractor and secured in place in the same manner that tank 26 was secured in place. The lines 72 are then connected between the valve assembly 70 associated with the nitrogen tank and the valve 75 attached to the valve assembly 74 leading to the chemical tank 26. A separate line 76 is then connected between the chemical source and the inlet to the metering unit 38 while a pressurization line 73 is connected from the valve assembly 70 associated with the inert gas supply to the discharge valve 79 at the top of the metering tank. Discharge line 42 is thereafter connected to valve 78 so that the injection conduit 44 is connected for dispensing of chemicals from the metering tank as desired. Once the metering tank 38 is filled with a proper amount of chemical as previously discussed by operation of the various valves in the fluid circuit, the operator of the implement initiates the downward movement of the earth penetrating bit 34 by activation of the hydraulic cylinder through fluid line 29. After the ground engaging bit reaches the desired level of penetration, the metering unit 38 is opened to pressure from the inert gas supply so that the chemicals contained therein are discharged through the opening 45 in the nozzle and outwardly through the slot 37 formed in the end 36 of the earth penetrating bit 34. The operator thereafter initiates the withdrawal of the earth penetrating bit and discharge nozzle by reverse operation of the hydraulic cylinder 24. As the earth engaging bit is removed from the opening in the earth, the tamping mechanism is operated and driven into engagement with the ground thereby closing the bore and entrapping the chemical which has been previously injected therein. The valves are then adjusted so that a second charge of chemical is introduced into the metering tank 38 in preparation for a second injection at a spaced location.

I claim:

1. An apparatus for injecting chemicals into the earth and which is mounted to a vehicle having a power system comprising an earth penetrating bit mounted to the vehicle, said bit having upper and lower ends and an elongated axis, a dispensing nozzle means mounted to said bit and terminating in spaced relationship from said lower end thereof, power means for selectively moving said bit from a first elevated position to a second position in which said lower end and said dispensing nozzle means penetrates the earth to create a bore therein, chemical supply means, mounting means for mounting said chemical supply means relative to the vehicle, first conduit means connecting said chemical supply means to said nozzle means, tamping means mounted to the vehicle adjacent said bit, means for guiding said tamping means from a first position spaced from the axis of said bit to a second position in contact with the earth and intersecting the axis of said bit so as to close the bore therein, and means for supplying chemical from said supply means and through said first conduit means to said nozzle means, whereby when said bit is in said second position chemical from said supply means may be supplied to said nozzle means and when said bit is elevated to said first position said tamping means may be moved to said second position to close the bore created by said bit.

2. The apparatus of claim 1 in which said bit includes an outer surface, a recess formed in said outer surface adjacent said lower end thereof, said recess extending generally transverse to said axis of said bit, said nozzle means including an outlet opening oriented toward said recess and toward said axis of said bit.

3. The apparatus of claim 2 in which said nozzle means includes a pipe means having upper and lower ends, said pipe means being mounted to said bit, said outlet opening being formed adjacent said lower end of said pipe means and said upper end of said pipe means terminating adjacent said upper end of said bit.

4. The apparatus of claim 3 in which said bit includes an elongated recess along a portion of the length thereof so as to be generally parallel to said axis, said pipe means being cooperatively seated within said elongated recess.

5. The apparatus of claim 3 in which said first conduit means is flexible so as to be extendable from said first position to said second position.

6. The apparatus of claim 1 in which said chemical supply means includes a supply tank and a metering tank, second conduit means connecting said supply tank to said metering tank, said first conduit means extending from said metering tank to said nozzle means.

7. The apparatus of claim 6 in which said means for supplying chemical from said supply means includes a pressurization means, third conduit means connecting said pressurization means to said metering tank, and valve means connected between said pressurization means and said metering tank for selectively introducing pressurization from said pressurization means to force chemicals from said metering tank through said first conduit means to said nozzle means.

8. The apparatus of claim 7 including fourth conduit means, said fourth conduit means connected to said pressurization means and said supply tank, and second valve means for selectively opening said fourth conduit means so as to supply pressure to said supply tank.

9. The apparatus of claim 8 in which said pressurization means includes a pressurized tank of inert gas.

10. The apparatus of claim 1 in which the vehicle power system includes a hydraulic system, said power means includes a cylinder means having a piston means extendable therefrom, said piston means having upper and lower ends, said bit being mounted to said lower end of said piston means, and fluid line means connecting said cylinder means to the hydraulic system of the vehicle.

11. The apparatus of claim 10 in which said tamping means includes a second cylinder means having a second piston means extendable therefrom, said second piston means having upper and lower ends, a tamping plate connected to said lower end of said second piston means, and second fluid line means connecting said second cylinder means to the hydraulic system of the vehicle.

12. The apparatus of claim 1 in which said tamping means includes an elongated housing, a piston slideably carried within said housing so as to be extendable with respect thereto, said piston having a lower end, a tamping plate secured to said lower end of said piston, and resilient means connected between said housing and said piston for normally urging said piston toward said housing.

13. An apparatus for injecting chemicals into the earth and which is mounted to a vehicle having an auxiliary power system which includes a hydraulic system comprising a first hydraulic cylinder mounted to the vehicle, said first hydraulic cylinder having an extendable rod, a combination earth penetrating bit and fluid nozzle mounted to said extendable rod, said combination bit and nozzle means having upper and lower ends which are aligned along an elongated axis, said bit being movable from a first elevated position to a second position in which said combination bit and nozzle means penetrate the earth to create a bore therein, chemical supply means mounted in fixed relationship to the vehicle, first conduit means connecting said chemical supply means to said combination bit and nozzle means, tamping means mounted the vehicle adjacent said combination bit and nozzle means, guide means for guiding said tamping means from a first position spaced from the axis of said combination bit and nozzle means to a second position in contact with the earth and intersecting the axis of said combination bit and nozzle means, and means for supplying chemical from said supply means and through said first conduit means to said combination bit and nozzle means, whereby when said combination bit and nozzle means are elevated to said first position said tamping means is moved to said second position to close the bore created by said combination bit and nozzle means.

14. The apparatus of claim 13 in which said tamping means includes an elongated housing, a piston slideably carried within said housing so as to be extendable with respect thereto, said piston having a lower end, a tamping plate secured to said lower end of said piston, and resilient means connected between said housing and said piston for normally urging said piston toward said housing.

15. The apparatus of claim 13 in which said tamping means includes a cylinder means having a piston means having upper and lower ends, a tamping plate connected to said lower end of said piston means, and fluid line means connecting said cylinder means to the hydraulic system of the vehicle.

16. The apparatus of claim 13 in which said chemical supply means includes a supply tank and a metering tank, second conduit means connecting said supply tank to said metering tank, said first conduit means extending from said metering tank to said combination bit and nozzle means.

17. The apparatus of claim 16 in which said means for supplying chemical from said supply means includes a pressurization means, third conduit means connecting said pressurization means to said metering tank, and valve means connected between said pressurization means and said metering tank for selectively introducing pressure from said pressurization means to force chemicals from said metering tank through said first conduit means to said combination bit and nozzle means.

18. The apparatus of claim 17 including fourth conduit means, said fourth conduit means connected to said pressurization means and said supply tank, and second valve means for selectively opening said fourth conduit means so as to supply pressure to said supply tank.

* * * * *